Feb. 19, 1924.
J. G. A. KITCHEN
MEANS FOR CONTROLLING MOTION IN FLUID PRESSURE APPARATUS
Filed Jan. 30, 1923   2 Sheets-Sheet 1
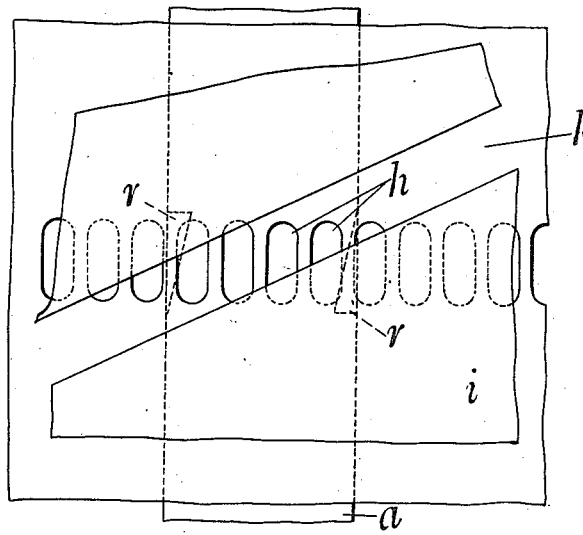
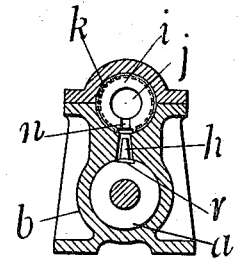
Fig.2
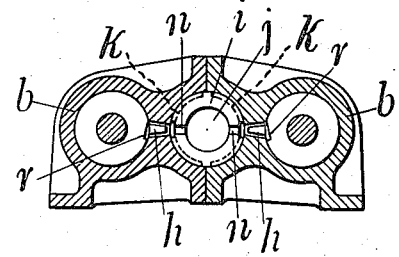
Fig.4
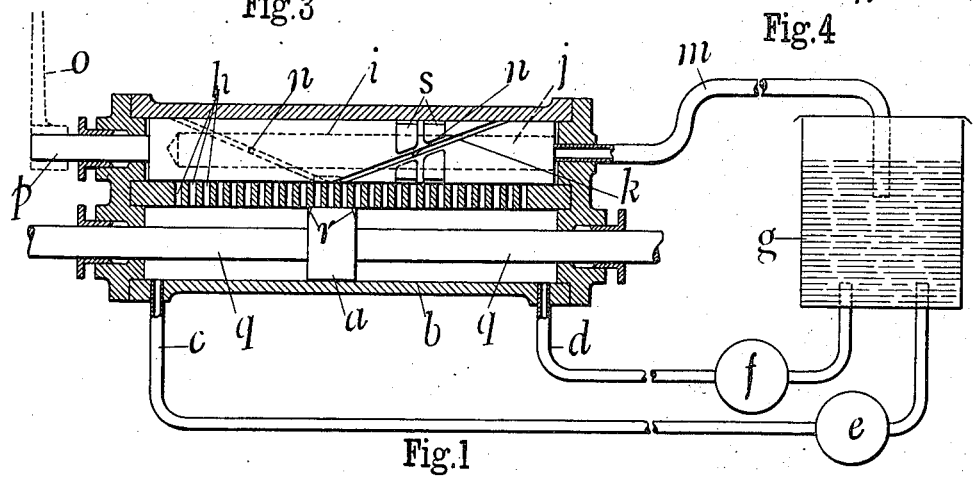
Fig.1
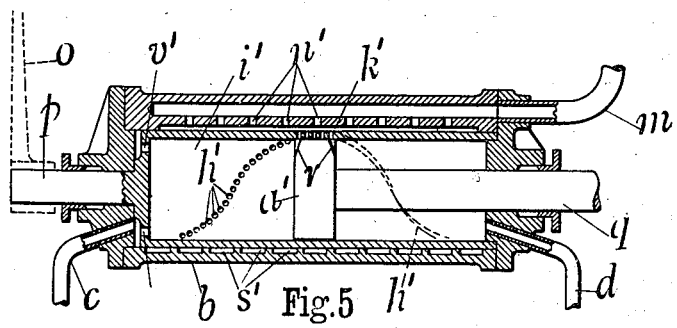
Fig.5
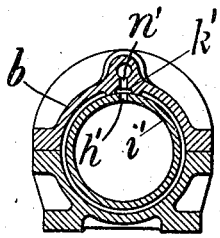
Fig.6
Inventor
J. G. A. Kitchen,
By Marks & Clerk Attys.

Feb. 19, 1924. 1,484,030
J. G. A. KITCHEN
MEANS FOR CONTROLLING MOTION IN FLUID PRESSURE APPARATUS
Filed Jan. 30, 1923 2 Sheets-Sheet 2

Inventor
J. G. A. Kitchen,
By Marks Clerk
Attys.

Patented Feb. 19, 1924.

1,484,030

UNITED STATES PATENT OFFICE.

JOHN GEORGE AULSEBROOK KITCHEN, OF LANCASTER, ENGLAND.

MEANS FOR CONTROLLING MOTION IN FLUID-PRESSURE APPARATUS.

Application filed January 30, 1923. Serial No. 615,958.

*To all whom it may concern:*

Be it known that I, JOHN GEORGE AULSEBROOK KITCHEN, a subject of the King of Great Britain and Ireland, and resident of 7 Rose Bank, Scotforth, Lancaster, in the county of Lancaster, England, have invented certain new and useful Improvements in and Relating to Means for Controlling Motion in Fluid-Pressure Apparatus (for which I filed an application in England Jan. 23, 1922), of which the following is a specification.

This invention relates to fluid pressure motors or engines of the type in which the piston is movable in a cylinder and is kept in equilibrium by the application of pressure fluid at its opposite sides, the movement of the piston being regulated by controlling, by suitable means, the location along the length of the cylinder at which discharge fluid can take place.

The present invention comprises the improved means hereinafter described and claimed for obtaining a more sensitive and accurate control of the position of the piston.

Referring to the two accompanying sheets of explanatory drawings:—

Figure 1 is a sectional elevation illustrating, in diagram form, a fluid pressure motor or engine constructed in one convenient form in accordance with this invention.

Figure 2 is a cross section through the motor or engine.

Figure 3 is an enlarged view of a portion of the discharge valve face.

Figure 4 is a cross section illustrating a modified construction of the motor or engine.

Figure 5 is a sectional elevation of a further modified construction of motor or engine and Figure 6 a cross sectional view of the same.

Figure 7:
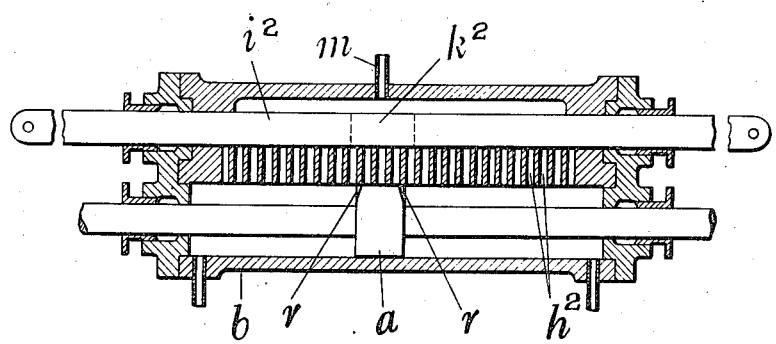
Figure 7 is a sectional elevation of another modified construction of motor or engine.
Figure 7A:
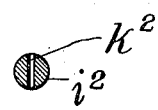

Figure 7ª is a sectional view through the valve shown in Fig. 7.

The same reference letters in the different views indicate the same or similar parts.

Referring in the first place to Figures 1, 2 and 3, the piston $a$ works in a cylinder $b$ which has fluid inlet connections $c$, $d$ at its opposite ends. Each of said connections has thereon a pump $e$, $f$ which draws fluid from a tank or reservoir $g$.

Along one side of the cylinder $b$ is disposed a row of closely spaced ports $h$. Acting in conjunction with the latter is a rotary valve $i$ which is hollowed out at $j$ and has on its periphery a single helical groove $k$. The latter communicates with the discharge pipe $m$ leading to the reservoir $g$ by way of the ports $n$. The valve $i$ may be turned by any convenient means such as by the arm $o$ upon the valve spindle $p$. The piston $a$ is carried by a piston rod $q$ which has a longitudinal but no rotary movement.

The piston $a$ is provided with recesses $r$ (see Figures 1 and 3) in its opposite sides which serve to bridge the division piece between the ports $h$ and so provide for a continuous movement of the piston or for its motion being arrested with greater precision.

The valve $i$ is provided with a series of circumferential grooves or recesses $s$ (see Figure 1) which serve to make it easily rotatable and to balance the forces acting thereon. The said grooves or recesses are closely spaced from end to end of the valve, two only being shown in Figure 1 for the sake of clearness. They do not communicate with the helical groove $k$ but communicate with the cylinder $b$ by the ports $h$ so that practically the whole of the exterior of the valve is under the pressure of the fluid within the ends of the working cylinder $b$. The side pressure exerted through the ports $h$ on the valve is therefore balanced or neutralized. The axial width of the grooves $s$ is less than the axial length of the piston so that the grooves do not in any way disturb or interfere with the operation of the motor or engine.

The operation of the motor is as follows:— The pumps $e$ and $f$ would normally create pressures at the opposite ends of the cylinder $b$ and the piston $a$ would remain stationary if the said pressures balanced. If some of the ports $h$ be put in communication with the exhaust by the helical groove $k$, as shown to an enlarged scale in Figure 3, then assuming that the exhausting ports are to the right of the piston in Figure 1, the said piston will move to the right under the unbalanced pressure on its left side. Such unbalanced pressure acting through the piston rod can perform any desired external work. When, however, the piston $a$ has moved to a position in which it commences to uncover exhausting ports $h$ at its left side, the piston comes to rest for the excess or unbalanced pressure on the piston is released through the uncovered exhausting port. In Figure 3, it will be seen that parts of three ports are uncovered at one side of the piston and parts of two at the other side. The relation between the area of port uncovered at the opposite sides of the piston depends upon the amount of unbalanced pressure to be released to allow the piston to remain stationary.

By the employment of the single helical groove $k$ in combination with the row of closely spaced ports $h$ and the recesses $r$ in the piston, an exceedingly fine or sensitive control of the position of the piston $a$ can be effected for there is in effect a continuous exhausting passage due to the bridging of the ports by the recesses $r$.

In the arrangement shown in cross sectional elevation in Figure 4, two cylinders $b$ with their pistons $a$ are disposed on the opposite sides of the valve cylinder and there are two rows of ports $h$ and two helical grooves $k$, one for each cylinder $b$. With this construction, one valve $i$ with its two helical grooves serves for two working cylinders. It will be understood that more than two working cylinders with their reciprocating pistons may be disposed around a common valve cylinder.

In the construction shown in Figures 5 and 6, the cylinder in which the piston $a'$ works itself constitutes the rotary valve $i'$ and has a series of closely spaced ports $h'$ arranged in a helix. At one end the valve has ports $v'$ therethrough for the passage of the pressure fluid from the pump. In combination with the rotary valve $i'$ is arranged a straight groove or recess $k'$ communicating with the exhaust pipe $m$ by the ports $n'$. It will be seen that the positions of the ports of the helix $h'$ which communicate with the straight groove or recess $k'$ and so with the exhaust pipe $m$ serves, as in the previously described constructions, to determine the position at which the piston $a'$ will come to rest. The piston has recesses $r$ therein at its opposite sides. The grooves $s'$ in the cylinder $b$ and the annular space behind the ports $v'$ serve to float the valve $i'$ and facilitate its rotary movement.

Referring to Figure 7, the valve $i^2$ is adapted to have a longitudinal movement imparted to it to bring a narrow slot or aperture $k^2$ therein into a position to put any desired section of the ports $h^2$ into communication with the exhaust port $m$. The operation of this form of motor or engine is, however, similar to that of the forms previously described. The slot or aperture $k^2$ may be replaced by a circumferential recess around the valve $i^2$.

It will be understood that by slowly rotating the valve $i$ of the forms shown in Figures 1 to 6, or reciprocating the similar valve of the form of construction shown in Figure 7, the piston $a$ can be caused to have a continuous reciprocatory movement.

Instead of employing a double acting cylinder $b$ and piston $a$, twin opposed cylinders and rams which are the mechanical equivalent thereof may be employed.

The extent or area of the ports $h$ which at any time register with the discharge groove $k$, and are thus put into communication with the exhaust $m$, is constant in length and traversible from end to end of the cylinder $b$ and will, for convenience, be hereinafter termed the movable discharge area.

When the piston $a$ has taken up a position of equilibrium, the length of the piston surface which may be recessed or angled as at $r$ as before described forms an element of the movable discharge area regulating the amount of exhaust from each side of the piston. In the carrying out of the invention, the length of the movable discharge area will be made greater than equal to or smaller than the length of the piston according to the nature of the pressure supply which enters at the inlets $c$ and $d$.

When the pressure supply at each inlet is constant as to quantity of fluid passed, the length of the movable discharge port will be greater than the length of the piston, thus permitting of a varying proportion of effective discharge port on each side of the piston.

When the pressure supply at each inlet is variable as to quantity passed with a limited maximum pressure value at which delivery stops, the length of the movable discharge port may be greater or smaller than the length of the piston according to the holding pressures desired when the piston has taken up a position of equilibrium under an external load.

When the pressure supply at each inlet is variable as to quantity passed with a limited maximum pressure value at which delivery stops, and a suitable automatic device of known form is incorporated shutting off the pressure inlet towards which the movable discharge port is about to be moved, the length of the movable discharge port will be equal to or smaller than the length of the piston, and in this case no flow of fluid will occur when the piston has taken up a position of equilibrium wholly covering the discharge port.

The means for obtaining these different natures of pressure supply do not form part of the present invention.

The improved apparatus is generally applicable where a variable motion which is steady and continuous is required, as for example, in the actuation or control of presses, guns and gun mountings; for brakes for vehicles and machinery, ship's steering gear, lifts and hoisting apparatus and like appliances, and is particularly applicable where direct and positive control of motion is desired from a central position remote from the apparatus.

I claim:—

1. A fluid pressure motor or engine comprising in combination, a piston with recesses at its opposite sides, a cylinder for said piston, with means for applying pressure to the opposite sides of said piston, an exhaust connection, and a valve controlling communication between the opposite sides of the said piston and the exhaust connection, the said valve comprising three elements, one having a movable discharge area therein, a second element having a fixed discharge area, one of said two last named elements being the cylinder aforesaid, one of said discharge areas consisting of a row of closely spaced ports extending the full length of the cylinder, and the third element consisting of the piston aforesaid, which automatically regulates the size of the discharge area available at its opposite sides when equilibrium is established, the recesses in said piston lying contiguous to and being adapted to bridge over the spaces between the spaced ports.

2. In a fluid pressure motor or engine, in combination, a piston, a cylinder for said piston, means for applying pressure to the opposite sides of said piston, an exhaust connection, and a valve controlling communication between the opposite sides of said piston and the exhaust connection, the said valve comprising three elements, one being the piston aforesaid, the second having a fixed single channel or groove therein and the third a single helical row of closely spaced ports therein, one of said two last named elements being the cylinder aforesaid, the third element being rotatable to bring any portion of said row of ports into communication with said channel or groove, said channel or groove having permanent communication with the exhaust connection.

3. In a fluid pressure motor or engine, a piston, a cylinder for said piston, means for applying fluid pressure to the opposite sides of the piston, a movable sleeve between said cylinder and piston, said sleeve having a helix of closely spaced ports, means for turning said sleeve, said cylinder having a single channel in the wall thereof, exhausting means, and means placing said channel in communication with the exhausting means.

4. A fluid pressure motor as claimed in claim 3, characterized in that the cylinder is provided with grooves closed at their opposite ends and arranged around the sleeve and to which pressure fluid from the interior of the sleeve gains access through the helix of the closely spaced ports.

In testimony whereof I have signed my name to this specification.

JOHN GEORGE AULSEBROOK KITCHEN.